Patented Dec. 19, 1922.                                                   1,439,056

UNITED STATES PATENT OFFICE.

LEO H. BAEKELAND, OF YONKERS, NEW YORK, ASSIGNOR TO BAKELITE CORPORATION, OF NEW YORK, N. Y., A CORPORATION OF NEW YORK.

COMPOSITION CONTAINING PHENOLIC CONDENSATION PRODUCTS AND METHOD OF PREPARING THE SAME.

No Drawing.            Application filed September 21, 1918. Serial No. 255,170.

*To all whom it may concern:*

Be it known that I, LEO H. BAEKELAND, a citizen of the United States, residing at Yonkers, in the county of Westchester and State of New York, have invented certain new and useful Improvements in Compositions Containing Phenolic Condensation Products and Methods of Preparing the Same, of which the following is a specification.

In the manufacture of phenolic condensation products of the infusible type, relatively few solvents can be added which do not separate from the solid solution when the material reaches the final infusible stage. Yet it is frequently desirable, in many industrial applications of these phenolic condensation products, that there should be added to them, or to mixtures containing them, substances which modify to a certain degree their hardness, or which confer more plasticity during the operation of molding. Again, if it be attempted to utilize such solvent addition agents, it is found that many of them introduce decidedly objectionable features, either as regards the color, or the homogeneity, or other properties of the final product.

In order to obviate this difficulty, according to the present invention, I employ as addition agents substances which have a chemical relationship to the phenolic bodies from which these condensation products originate, but which, at the same time, have sufficient chemical stability to insure that they are not transformed by side reactions, into bodies which are unsuitable for the purposes in view. According to my invention, such bodies are introduced into phenolic condensation products or mixtures containing them, said products being either of the permanently fusible (saliretin) type, or of the type which is capable of transformation by the action of heat into infusible bodies.

In making a comparative study of this class of chemicals in their application to this invention, I have come to the conclusion that the phenyl esters of inorganic oxyacids are particularly suited for my purposes, and may be mixed in relatively large proportions with phenolic condensation products without introducing objectionable features.

Under the name "phenyl esters" I include the products formed from phenol, cresol, or other homologues of phenol, or other phenolic bodies, in conjunction with suitable inorganic acid radicals, which esters may be prepared in accordance with well known methods. I do not, however, include in the above term the haloid substitution products of phenols, which are unsuited for the purposes of this invention. Nor do I include sulfonated fats and oils, or mixtures containing the same, which separate during the final hardening of the mass.

Among the esters of inorganic oxy-acids which are especially adapted for the purposes of this invention are phenol phosphate and phosphates of the homologues of phenol. These phosphates have the advantages of very low volatility, readiness of preparation, and high chemical stability. In the same way, the phosphates of the homologues of phenol or cresol, for example xylenols, may be used, or mixtures thereof:

$$(C_6H_5O)_3PO$$
$$(C_7H_8O)_3PO, \text{ etc.}$$

For example, I may use substantially pure ortho-cresyl-phosphate, or a mixture of cresyl phosphates containing a preponderating amount of ortho-cresyl-phosphate. Similarly, I may employ mixtures of meta-cresyl-phosphate and para-cresyl-phosphate, which are readily prepared from the commercial mixtures of meta- and para-cresol. The corresponding silicates, titanates, borates, molybdates and equivalent compounds may be similarly used.

Addition agents of the above-described character may be introduced in the most varied ways; for instance, they may simply be incorporated with the phenolic condensation product after its formation, whether the latter is of the permanently fusible variety (novolak, saliretin resins, etc.), or whether it be of that class of phenolic condensation products which first yields a fusible, soluble variety (so-called A) which on further heating, is transformed into a final infusible body (so-called C). Similarly, the addition agent can simply be added to an alcoholic or other solution in organic solvents (or so-called varnish) of the phenolic condensation product. Or the above-mentioned solvents can be added with the primary reacting bodies (phenol, cresol, formaldehyde, paraform, hexamethylene-tetramine, etc.), it being essential only that the addition agent or agents should be present when the reaction which engenders the final condensation product takes place. In the latter case, they may have the additional advantage of moderating the reaction and permitting better control.

The introduction of these bodies reduces considerably the tendency towards formation of bubbles.

There are still some other methods by which the above-mentioned solvents may be added and which, in some cases, may be preferable. For instance, in the manufacture of molding mixtures, these substances can be incorporated with or at the same time as the filling material (wood-fibre, etc., together with the difficulty volatile solvents, as for instance alcohol, acetone, or mixture of alchohol, benzol, etc., together with the difficultly volatile solvents above-mentioned, and afterwards to expel the volatile solvent from the mass. This method of procedure insures a better distribution of the difficultly volatile solvent throughout the mass, specially when the proportion thereof is relatively small.

There are still other ways of utilizing the above-mentioned phenyl ester solvents for controlling the plasticity or the fusibility of the so-called saliretin resins or novolak. For instance by their addition to the latter, it is possible to increase the fusibility of this class of phenolic condensation products without the necessity of leaving incorporated therein undesirable amounts, or excess, of phenol, cresol, or other phenolic bodies. This fact is particularly important in case the above-mentioned fusible resins are used in the so-called two-step process for the manufacture of infusible condensation products, as described for example in my prior Patent No. 1,038,475, patented September 10, 1912.

The proportions to be used may vary widely according to the technical effect which is to be obtained. Quantities as small as 5%, by weight of the phenolic condensation product have in some cases an appreciable effect, although for most purposes it is desirable decidedly to increase this proportion; for instance, from 20 to 60 parts, by weight, of phenyl ester for 100 parts of phenolic condensation product. In some cases, it is even advisable to use equal amounts by weight, or even more of the phenol ester. Mixtures containing relatively large amounts of the solvent can be used for instance for the impregnation of electric coils and other electric devices, or the impregnation of cardboard, pulp-board, wood or other porous bodies.

However the mixture may be prepared, its transformation into the final infusible body when a condensation product of this type is desired may be carried out under conditions now well understood in this art, the transformation being effected by application of heat, aided if desired by application of pressure, as disclosed for example in my prior Patent No. 942,699, patented December 7, 1909.

The term "phenol" is employed in the claims to include the homologues of phenol, and in general phenolic bodies yielding esters capable of serving as addition agents for phenolic condensation products in accordance with this invention.

I claim:—

1. In the preparation of phenolic condensation products and compositions containing the same, the method which consists in introducing thereinto a phenyl ester, of an inorganic oxy-acid, said ester being capable of entering into homogeneous solid solution in the condensation product.

2. In the preparation of phenolic condensation products and compositions containing the same, the method which consists in introducing thereinto phenyl phosphate.

3. In the preparation of phenolic condensation products and compositions containing the same, the method which consists in introducing thereinto a phenyl ester of an inorganic oxy-acid and subjecting the resulting material to a hardening operation, said ester being capable of entering into homogeneous solid solution in the condensation product.

4. In the preparation of phenolic condensation products and compositions containing the same, the method which consists in introducing thereinto phenyl phosphate and subjecting the resulting material to a hardening operation.

5. A new composition of matter containing a phenolic condensation product and a phenyl ester, of an inorganic oxy-acid, said ester being capable of entering into homogeneous solid solution in the condensation product.

6. A new composition of matter containing a phenolic condensation product and phenyl phosphate.

7. A new composition of matter containing a phenolic condensation product of the infusible type and a phenyl ester of an inorganic oxy-acid, said ester being capable of entering into homogeneous solid solution in the condensation product.

8. A new composition of matter containing a phenolic condensation product of the infusible type and phenyl phosphate.

9. In the preparation of phenolic condensation products and compositions containing the same, the method which consists in introducing thereinto a phenyl ester and a more volatile solvent.

10. In the preparation of phenolic condensation products and compositions containing the same, the method which consists in introducing thereinto a phenyl ester having an inorganic acid radical and a more volatile solvent.

11. In the preparation of phenolic condensation products and compositions containing the same, the method which consists in introducing thereinto phenyl phosphate and a more volatile solvent.

12. In the preparation of phenolic condensation products and compositions containing the same, the method which consists in introducing thereinto a phenyl ester and a more volatile solvent, and converting the body into the infusible state with expulsion of said volatile solvent.

13. In the preparation of phenolic condensation products and compositions containing the same, the method which consists in introducing thereinto a phenyl ester having an inorganic acid radical and a more volatile solvent and converting the body into the infusible state with expulsion of said volatile solvent.

14. In the preparation of phenolic condensation products and compositions containing the same, the method which consists in introducing thereinto phenyl phosphate and a more volatile solvent and converting the body into the infusible state with expulsion of said volatile solvent.

In testimony whereof, I affix my signature.

LEO H. BAEKELAND.